March 25, 1952 E. BOCKMEYER 2,590,496
REFRIGERATED CASE WITH FORCED CIRCULATION OF AIR
Filed Aug. 6, 1949 2 SHEETS—SHEET 1

INVENTOR.
ELDON BOCKMEYER
BY
ATTORNEYS.

March 25, 1952 E. BOCKMEYER 2,590,496
REFRIGERATED CASE WITH FORCED CIRCULATION OF AIR
Filed Aug. 6, 1949 2 SHEETS—SHEET 2

INVENTOR.
ELDON BOCKMEYER
BY
ATTORNEYS.

Patented Mar. 25, 1952

2,590,496

UNITED STATES PATENT OFFICE 2,590,496

REFRIGERATED CASE WITH FORCED CIRCULATION OF AIR

Eldon Bockmeyer, Philadelphia, Pa.

Application August 6, 1949, Serial No. 108,981

3 Claims. (Cl. 62—89.5)

This invention relates to a refrigerated case and is of particular utility when the case is of the display type. Although the case of this invention may be used for storing any item which must be kept refrigerated, it is of special merit when used for the storage of meats.

There exists today numerous problems with respect to refrigerated cases. In the first instance, there has been experienced great difficulty in maintaining the desired temperature and humidity conditions within the case. The maintenance of these conditions is of particular importance where meat is being refrigerated. For example, when fresh beef is exposed to a 35° F. temperature and a humidity of 82%, it improves in edibility for a period of ten days to two weeks. Fresh cut meat will keep a bright color and moist appearance for periods up to two days if not exposed to direct sunlight or white fluorescent bulbs. It will experience a shrinkage due to evaporation of only about .2% in twenty-four hours.

In the average meat case, however, in order to maintain a case temperature of 35° F., it has been necessary to keep the cooling coils at a temperature of about 10° F. This results in a relative humidity of about 50% where the case temperature is 35° F. Under these conditions, fresh meat will start to darken in color within an hour and will lose weight at the rate of 2% in twenty-four hours. Consequently the butcher suffers due to a loss of weight incident to both a loss of moisture and the fact that discolored portions of the meat must be cut away and since the meat becomes less palatable.

Attempts to remedy the humidity situation where meat is being refrigerated by using a blower to accelerate the circulation of air past the cooling coils have been generally unsuccessful due to the fact that the accelerated flow of air over the meat brings about a discoloration condition known as windburn.

Further, the handling of the moisture forming in the vicinity of the cooling coils has posed problems which have not been adequately solved. In the first place, it is necessary to have drip pans to catch the moisture running off of the cooling coils and their associated fins. These drip pans generally result in blocking to a considerable extent the free flow of cold air preventing the desirable thermo-syphon action. Again, frosting and icing conditions about the cooling coils and fins have inhibited the proper heat exchange and have necessitated frequent defrostings. In order to defrost properly, it has been necessary to stop refrigerating for such a long time that the case reaches an undesirably high temperature.

The refrigerated case in accordance with this invention successfully attacks all of the above briefly indicated problems and thereby provides a refrigerated case which is vastly superior to those heretofore known.

It is, therefore, an object of this invention to provide a refrigerated case having improved refrigerating conditions.

It is a further object of this invention to provide a refrigerated case which provides proper refrigerating temperatures and yet utilizes higher cooling coil temperatures.

It is a further object of this invention to provide a refrigerated case which provides proper refrigerating temperatures and yet utilizes higher cooling coil temperatures and has a low velocity of air movement in the vicinity of the stored product so that any meat being refrigerated will not suffer from discoloration incident to windburn.

It is an additional object of this invention to provide a refrigerated case having means for reducing frosting and icing in the vicinity of the cooling coils and fins.

An additional object of this invention is to provide a refrigerated case having superior means for carrying off moisture from the cooling tubes and fins and which only slightly impedes the flow of air within the case.

A still further object of this invention is to provide means whereby defrosting can be carried out rapidly, thereby preventing the temperature within the case from rising to an undesirable level.

These and other objects of this invention will become apparent on reading the description in conjunction with the following drawings, in which.

Figures 1, 2:
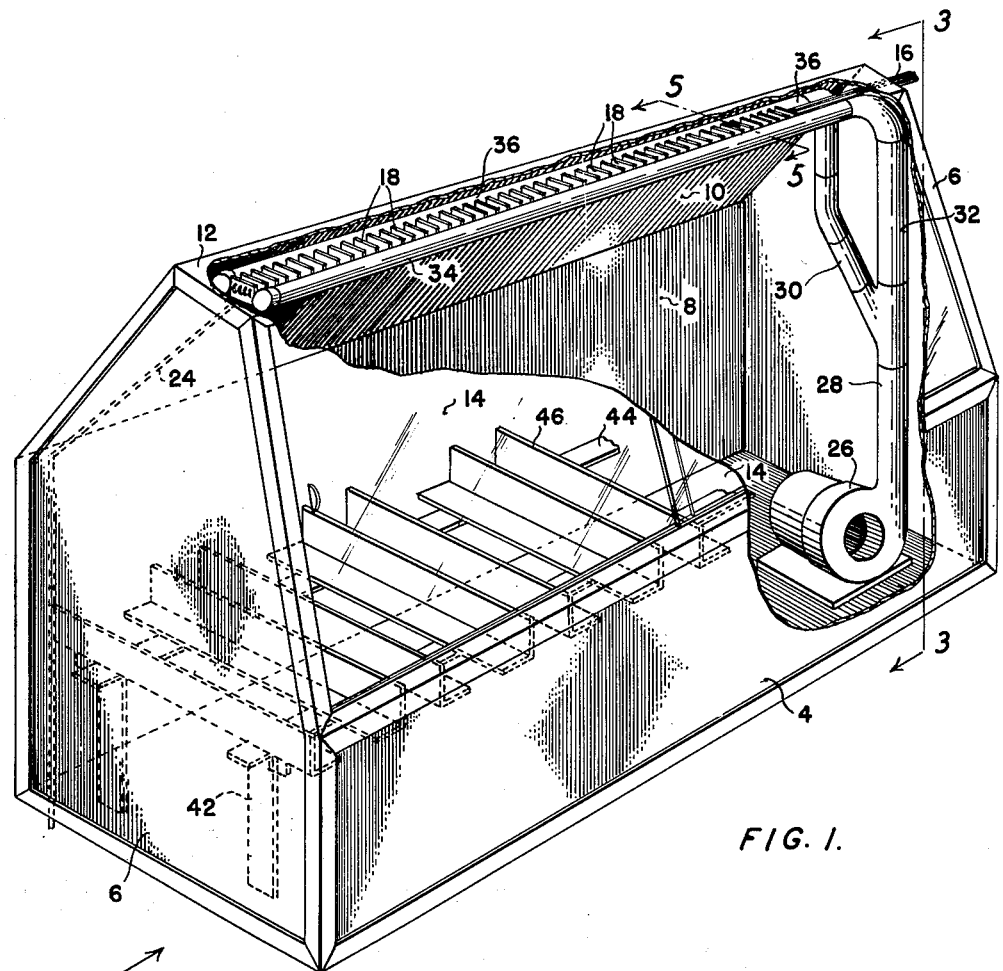
Figure 1 is a front perspective view of a refrigerated display case in accordance with this invention.
Figure 2 is a front perspective view of shelving within the display case of Figure 1.
Figure 5:
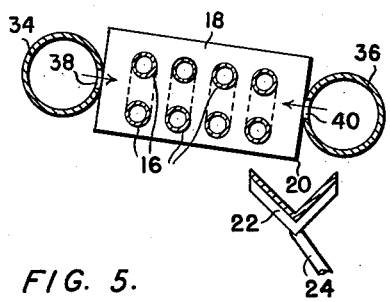
Figure 5 is a section taken on the plane indicated by the line 5—5 in Figure 1.

As shown in Figure 1, a refrigerated display case 2 in accordance with this invention has a front wall 4, side walls 6, rear walls 8 and 10, a top 12 and sliding glass doors 14. The various walls, the top and bottom of the casing are provided in the usual manner with suitable thermal insulation to prevent heat loss therethrough.

Cooling coils 16 which are adapted to carry a refrigerant pass through and are in contact with cooling fins 18. The coils 16 and fins 18 are supported within the case adjacent top 12.

Figure 3:
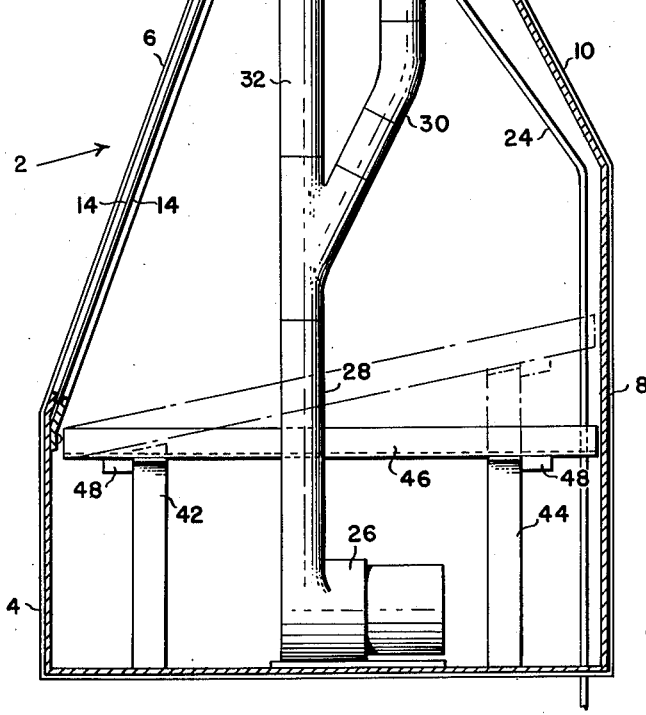
Figure 3 is a section taken on the plane indicated by the line 3—3 in Figure 1.

As will be seen particularly in Figure 3, fins 18 are quadrilaterals angularly disposed so that the lowest corner 20 of each fin is directly over a small trough 22. The trough 22 slopes gradually downwardly from the right end of case 2 as viewed in Figure 1 and is connected at its left hand end to a drain pipe 24 which passes through the bottom of the case. It will be particularly noted that the angular displacement of the fins causes the moisture to flow towards the low corner 20 of each fin where it will drop off the fin. This permits the use of a very narrow trough which, as illustrated by trough 22, occupies only a small portion of the space below the cooling coil and fin assembly and thus interferes with the flow of air a minimum amount.

Fins 18 are formed of metal. In order to deter water from building up on the surfaces of the fins in the form of streams and drops and promote an even diffusion of the moisture over all of the fin surfaces, the surfaces of the fins are freed of any grease or other film which may be lying on the surface. This may be satisfactorily accomplished by any conventional so-called degreasing agent, for example trisodium phosphate, carbon tetrachloride and sodium hydroxide. Etching or roughening of the surface also is efficacious in getting an even distribution or diffusion of the moisture. Nitric acid, sulphuric acid and a mixture of these acids may be used.

A blower 26 is secured to the bottom of case 2 and supplies air taken in at the bottom of the casing to a duct 28. Duct 28 is connected to ducts 30 and 32 which, in turn, are connected to ducts 34 and 36. Ducts 34 and 36 are parallel and lie adjacent opposite ends of fins 18. Ducts 34 and 36 have openings 38 and 40, respectively, which are oppositely disposed and are adapted to provide two opposing streams of air passing between fins 18 and through cooling tubes 16.

The case contains means for supporting items of various sizes within the case comprising a front bench 42 and a rear bench 44 secured to the bottom of the case. Right angled members 46 arranged in angle facing pairs rest on benches 42 and 44. Each member 46 is provided with stops 48 to engage the outer sides of benches 42 and 44, respectively, so as to prevent forward or rearward motion of the members 46. The members 46 are adjustably spaced apart so as to provide for the accommodation of items of various sizes.

It will be observed that ducts 34 and 36 as supplied by blower 26 provide a high velocity of air movement through the cooling coils and fins. It will further be observed that this high velocity air movement is in a substantially horizontal direction. Thus a high velocity of air movement through the cooling coil-fin assembly is achieved without resulting in a high velocity air movement in a vertical direction past the items being refrigerated and consequently avoiding windburn in the case of meats. In such an installation, it has been found that the high velocity of circulation of air through the cooling coil-fin assembly in such a case permits operation of the cooling coils at about 25° F. instead of the usual 10° F. where it is desired to maintain a cased temperature of about 35° F. while utilizing the same amount of cooling coil normally utilized. The maintenance of the cooling coils at this higher temperature, i. e., about 25° F., results in a relative humidity of about 80% which is about 30% higher than results where the coils are maintained at 10° assuming that the air being cooled in both cases is fully saturated.

The rapid flow of air through the cooling coil-fin assembly provides for defrosting in a minimum period of time. This, in turn, of course, means that the temperature within the case will be permitted to rise only slightly, thus maintaining a more constant temperature than cases in which the defrosting takes a longer time. It has been found that, where coils are being maintained at 25° F., the refrigerated case in accordance with this invention can be generally defrosted with a resultant temperature rise within the case of not over 2°.

Figure 4:
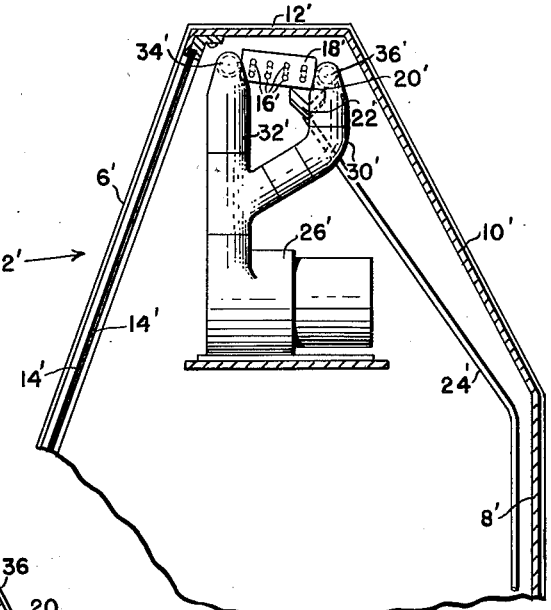
Figure 4 is a vertical section of a modified refrigerated display case in accordance with this invention showing the blower located in the upper portion of the casing adjacent the cooling coils and fins.

Referring now to Figure 4, a modified refrigerated case 2' which is identical with refrigerated case 2 with the one exception that the blower 26' is located in the upper portion of the case is illustrated. As shown, the upper portion of the case 2' has rear walls 8' and 10', a top 12' and glass doors 14', the lower portion of the case not being shown as it is identical with that of case 2.

Blower 26' is connected to ducts 30' and 32' which supply ducts which provide an opposing flow of air through coils 16' and fins 18'.

Figure 4 indicates that the point within the case at which the blower intake is located may be varied depending on how much one desires to rely on distribution of the cold air through thermo-syphon action and how much one desires to rely on circulation of air through the case due to the action of the blower. It will be apparent from observing Figure 4 that rapid circulation of air will be provided through the cooling coil-fin assembly in the embodiment of Figure 4 as is provided in the embodiment of Figures 1 and 3. The case arrangement of Figure 4, however, even further reduces the velocity of air movement about the items being refrigerated in that it will be apparent that the circulation of air through the case where the various items are stored will be the result of thermo-syphon action, that is, a result of the cold air settling and the warmer air being displaced upwardly. Such an arrangement as shown here in Figure 4 is particularly desirable where items highly sensitive to windburn are being refrigerated. Such an arrangement is highly novel in that rapid circulation of air through the cooling coil fin arrangement is achieved by a blower and yet the blower is not operative to force air throughout that portion of the case in which the items being refrigerated are located.

It will be apparent that the above description and the drawings are for purposes of illustration only and it is desired to be limited only as set forth in the claims.

What is claimed is:

1. A refrigerated storage chamber comprising a casing, spaced metal cooling fins located in the upper portion of the casing, said fins being angularly disposed so as to have one end lower than the other and having roughened surfaces, a refrigerating coil passing through said fins, a drain trough located below the lowest point of said fins, the width of the trough being relatively small in comparison with the width of each fin, a blower located within said casing and a pair of air ducts connected to the discharge side of said blower and disposed on opposite sides of the fins, the ducts having openings facing the coil and lying in a substantially horizontal plane to provide oppositely directed streams of air to pass through the fins and coil.

2. A refrigerated storage chamber comprising a casing, spaced metal cooling fins located in the upper portion of the casing, said fins being angularly disposed so as to have one end lower than the other and having roughened surfaces, two groups of refrigerating coils passing through said fins, said groups of coils lying in parallel planes lying at a small angle to the horizontal, a drain trough located below the lowest point of said fins, the width of the trough being relatively small in comparison with the width of each fin, a blower located within said casing, and a pair of air ducts connected to the discharge side of said blower and disposed on opposite sides of the fins, the ducts having openings facing the coil and lying in a substantially horizontal plane to provide oppositely directed streams of air to pass through the fins and coil.

3. A refrigerated storage chamber comprising a casing, spaced metal cooling fins located in the upper portion of the casing, said fins being angularly disposed so as to have one end lower than the other and having roughened surfaces, a refrigerating coil passing through said fins, a blower having its intake located in the upper portion of the casing and a pair of air ducts connected to the discharge of said blower and disposed on opposite sides of said fins, the ducts having openings facing the coil and lying in a substantially horizontal plane to provide oppositely directed streams of air to pass through the coil.

ELDON BOCKMEYER.

REFERENCES CITED

The following references are of record in the file of this patent:

UNITED STATES PATENTS

| Number | Name | Date |
| --- | --- | --- |
| 1,515,546 | Browne | Nov. 11, 1924 |
| 2,136,222 | Starr | Nov. 8, 1939 |
| 2,181,637 | Ardito | Nov. 28, 1939 |